UNITED STATES PATENT OFFICE.

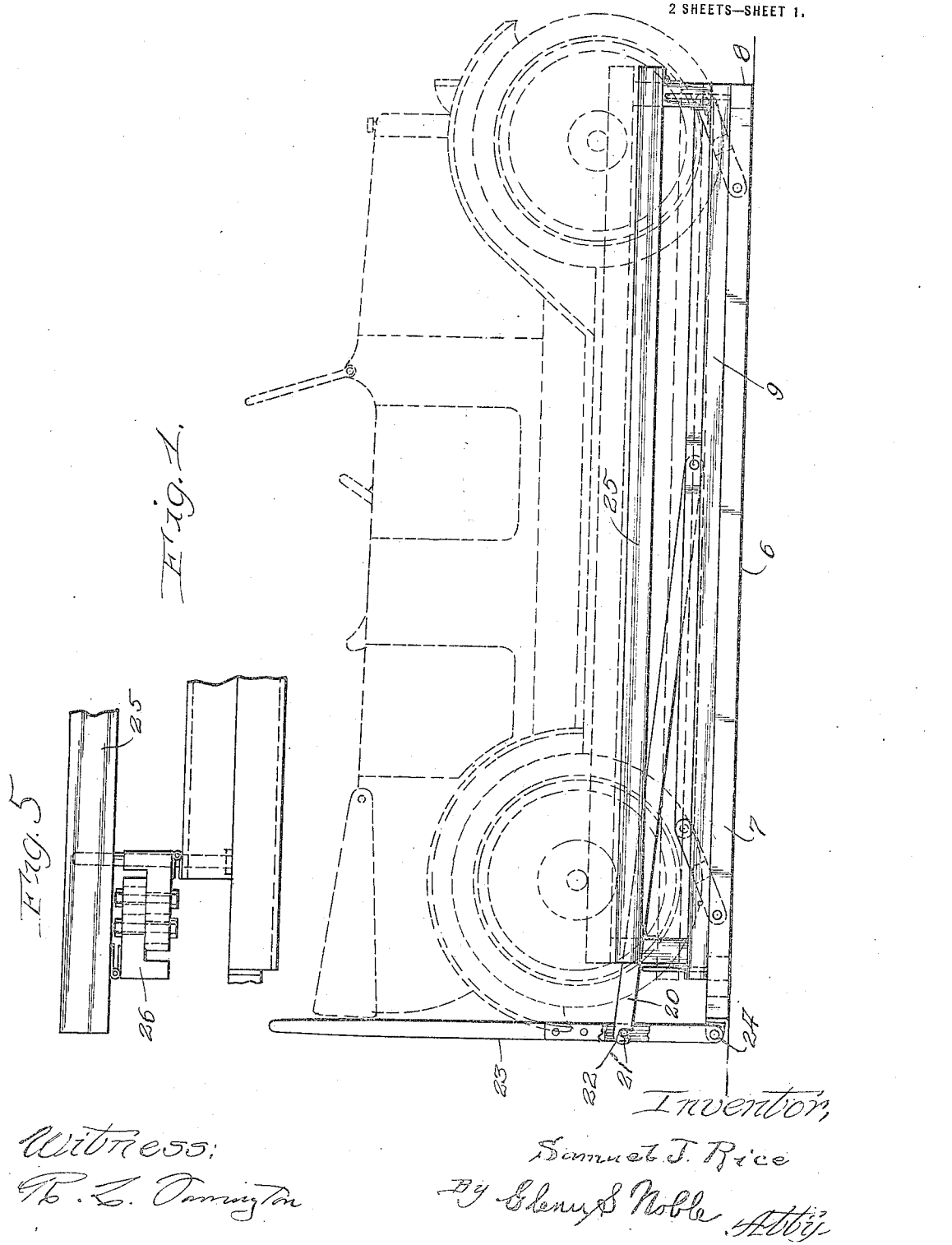

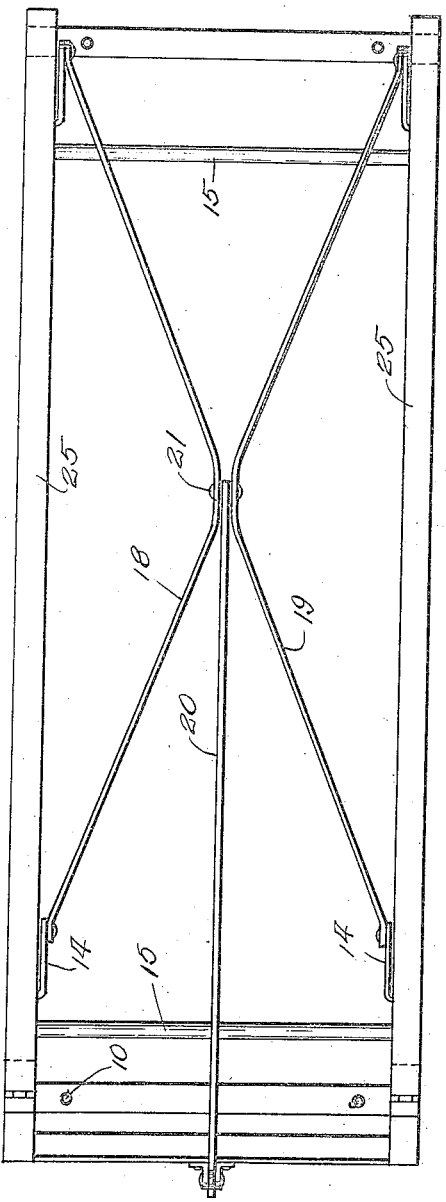
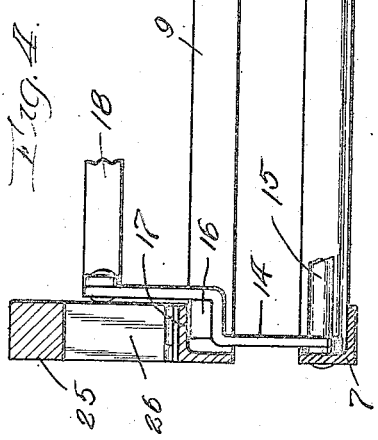
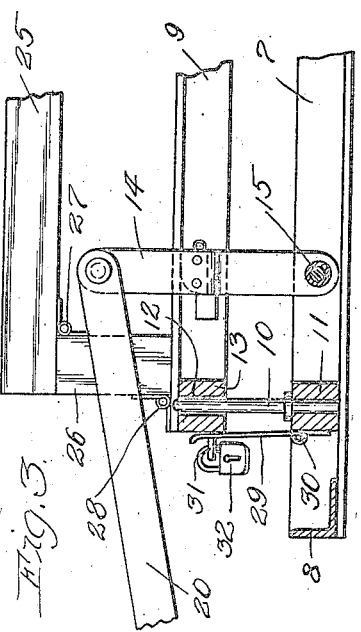

SAMUEL J. RICE, OF CHICAGO, ILLINOIS.

AUTOMOBILE JACK.

1,425,134.  Specification of Letters Patent.  Patented Aug. 8, 1922.

Application filed January 3, 1921. Serial No. 434,665.

*To all whom it may concern:*

Be it known that I, SAMUEL J. RICE, a citizen of the United States, and residing at Chicago, in the county of Cook and State of Illinois, have invented certain new and useful Improvements in Automobile Jacks, of which the following is a specification.

This invention relates to jacks or lifting devices or for vehicles, such as automobiles or the like and more particularly to a device of this character, which is adapted to elevate and support the entire car.

The objects of this invention are to provide an improved jack, which is adapted to raise automobiles off from the ground and support it in raised position;

To provide a device of this character whereby the vehicle may be lifted by the movement of a single lever;

And in general to provide such an improved construction as will appear more fully from the following description.

In the accompanying drawings showing a preferred form of my invention;

Figure 1 is a side view with an automobile shown in dotted lines, in raised position;

Figure 2 is a plan view;

Figure 3 is a detail on an enlarged scale illustrating the lifting mechanism;

Figure 4 is a cross sectional view of the parts shown in Figure 3; and,

Figure 5 is a detail showing one of the adjustable rails in lowered position.

As shown in these drawings, the jack has a base or frame 6 which may be made in any suitable manner, but preferably consists of side bars 7 and end bars or cross pieces 8. A vertically movable frame 9 is mounted above the base 6 and is guided in this movement by means of pins 10, which are secured in cross pieces 11 in the base 6 and engage with holes 12 in cross pieces 13 of the frame 9.

The frame 9 is raised by means of suitable mechanism whereby sufficient leverage is provided so that it can ordinarily be lifted by one person. In the present instance I provide links 14 which are pivoted on shafts 15 in the base 6. These links have curved shoulders or cams 16, which engage with the flanges 17 of the side bars of the frame 9. The links on one side of the jack are connected by a bar 18 and the links on the opposite side are connected by a bar 19. These bars are bent inwardly as shown in Figure 2 and are connected to a draw bar 20 by means of a pivot 21. The draw bar 20 has a hook 21' at one end for engagement with a pin 22 in a lever 23, which lever is pivoted at 24 to the base 6.

In some instances the structure thus described would be sufficient if the parts were made to fit a particular type or make of car. However, I prefer to have vertically adjusted rails or beams 25, which engage directly with the axles of the car. These rails are hinged at their end to short adjustable posts 26 by means of hinges 27. The posts are hinged to the frame 9 by means of hinges 28, the arrangement being such that the rails may be lowered by moving them in one direction as indicated in Figure 5.

My improved jack or lifting apparatus is intended to remain in substantially fixed position in the garage and the car is driven over the same preparatory to being elevated. It will be noted that the lever 23 may be released from the hook 21' and lowered so that the car can be driven on from either direction. The rails 25 will ordinarily be in lowered position when the car is driven over the jack. They are then swung upwardly as shown in Figure 1 preparatory for lifting the car. The lever 23 is then swung outwardly which causes the draw bar 20 to pull on the bars 18 and 19 and swing the links 14 up to vertical position as shown in Figures 3 and 4. The shoulder or cams 16 raise the frame 9 and this movement causes the rails 25 to engage with the axles of the car and raise it to elevated position.

Any suitable locking mechanism may be used for locking the frame 9 in raised position so that the car can not be readily removed from the jack. For instance this may be done by means of a hasp or arm 29, which is hinged at 30 to the cross piece 11 and is adapted to engage with a staple 31, which may be provided with a pad lock 32.

It is well understood that it is desirable to raise an automobile, when standing for any considerable length of time, so that it will not be supported by the tires. My invention provides means whereby this may be readily done, as well as means for protecting the car against being stolen. Furthermore the car may be held in raised position so that the lower parts will be more accessible when work is to be done underneath the car.

Having thus described my invention what I claim and desire to secure by Letters Patent is;

1. A jack for vehicles comprising a base, a single vertically movable frame mounted on said base, manually operable means for raising said frame with the vehicles thereon, and vertically adjustable members carried by the frame, and adapted to engage with the vehicle to be raised.

2. In a jack, the combination of a rectangular base, a frame mounted on said base, vertical guides for said frame, elevating mechanism for raising the frame, and adjustable rails carried by said frame and adapted to engage with the front and rear axle members of an automobile.

3. In the jack for vehicles, the combination of a rectangular base of approximately the length of the vehicle and adapted to fit between the vehicle wheels, a single vertically movable frame mounted on said base, links pivoted to said base and engaging with said frame for raising the same, bars connecting said links, a draw bar pivotally connected to said bars, a lever pivoted to said base and engaging with said draw bar, and vertically adjustable members carried by said frame and adapted to engage with the vehicle.

4. The combination of a rectangular base adapted to fit between the wheels of a vehicle, a vertically movable frame mounted on said base, cam links pivoted to said base and engaging with said frame for lifting the same, bars connecting the links on the respective sides of the frame, a draw bar pivotally connected to said bars and having a hook at its free end, a lever pivoted to said base and having a pin for engagement with said hook, posts hinged to the opposite side of said frame, and longitudinal rails hinged to said posts and adapted to engage with the vehicle, substantially as described.

SAMUEL J. RICE.